United States Patent [19]
Peelman

[11] 3,928,762
[45] Dec. 23, 1975

[54] PULSED NEUTRON COMBINATION WELL LOGGING SYSTEM

[75] Inventor: Harold E. Peelman, Houston, Tex.
[73] Assignee: Texaco Inc., New York, N.Y.
[22] Filed: May 6, 1974
[21] Appl. No.: 467,029

[52] U.S. Cl. ............... 250/270; 250/264; 250/269
[51] Int. Cl. .............................................. G01v 5/00
[58] Field of Search ........... 250/262, 264, 265, 266, 250/269, 270

[56] References Cited
UNITED STATES PATENTS

| | | | |
|---|---|---|---|
| 3,211,909 | 12/1965 | Owen | 250/264 |
| 3,413,471 | 11/1968 | Tittman | 250/270 |
| 3,825,753 | 7/1974 | Givens | 250/270 X |

Primary Examiner—Archie R. Borchelt
Attorney, Agent, or Firm—Thomas H. Whaley; Carl G. Ries; William J. Beard

[57] ABSTRACT

A pulsed neutron combination well logging system for performing simultaneous logs of hydrogen/oxygen ratio, chlorine log, and thermal neutron decay time is disclosed. A downhole pulsed neutron source repetitively irradiates the borehole environs with 14 MEV neutron pulses. Some of the fast neutrons are captured by oxygen. The remaining neutrons are rapidly slowed to thermal energy and captured by other materials in the borehole vicinity. Voltage pulses representative of the capture gamma rays are sent to the surface and input to a multichannel pulse height analyzer by three time gates. Output signals from the analyzer in three different energy regions corresponding to oxygen, chlorine and hydrogen are provided. These signals are used to determine the neutron thermal decay time, the hydrogen to oxygen ratio and the chlorine content of the earth formations, thus providing a direct indication of hydrocarbon contained in the pore spaces therein.

20 Claims, 7 Drawing Figures

PULSED NEUTRON COMBINATION WELL LOGGING SYSTEM

BACKGROUND OF THE INVENTION

1. Field of the Invention

This invention relates to well logging and more particularly to pulsed neutron well logging for the direct location and distinction of oil sands from water sands.

2. Description of the Prior Art

With the advent of pulsed neutron well logging it has become practice in well workovers to log cased well bores with some type of pulsed neutron log in order to determine the water saturation and hydrocarbon content of sands disposed externally of the steel casing in a cased well bore. Neutron lifetime well logging has become the predominant log used for this purpose. The thermal neutron decay time or lifetime log measures the rate of decay of the thermal neutron population in the vicinity of a well borehole. This log may be interpreted in terms of the macroscopic neutron cross section $\Sigma$ of the earth formations in the vicinity of the borehole. The element chlorine has a relatively large thermal neutron capture cross section with respect to other elements commonly found in earth formations in the vicinity of a well borehole. Hence chlorine influences the neutron life time log more than others commonly found. The neutron life time log or thermal neutron decay time log has been highly successful in determining the water saturation in the pore spaces of earth materials in the vicinity of a well bore when the pore spaces of such formations are filled with oil and salt bearing waters which have a high chlorine content. However, the thermal neutron decay time log or neutron lifetime log has been less successful in distinguishing oil from fresh water in earth formations which contain relatively little salt or other chlorine bearing compounds.

Another well logging approach which has been used in areas where the neutron lifetime log does not work as well as may possibly be desired is the carbon/oxygen well log. For example, in U.S. Pat. Nos. 3,780,301; 3,708,302 and 3,780,303, which are assigned to the assignee of the present invention, a pulsed neutron well logging system for locating and distinguishing oil from fresh water in earth formations in the vicinity of a borehole is disclosed. In this technique measurements are made of the inelastic scattering of fast neutrons, from earth materials in the vicinity of a well bore. Using this technique, extremely short duration (approximately 5 microseconds) bursts of high energy (14 MEV) neutrons are emitted from a pulsed neutron source and penetrate into earth formations surrounding the well bore. The high energy neutrons are inelastically scattered by elements comprising the rock matrix of the earth formations and the materials contained within the pore spaces therein. These inelastic scattering interactions cause the emission of high energy gamma rays which are characteristic of the elements comprising the rock matrix and the material in the pore spaces therein.

The inelastic scattering gamma rays are substantially present only during the period that the neutron burst is being emitted from the pulsed neutron source. Detectors carried in the well logging tool are used to detect (during the neutron burst) these gamma rays caused by inelastic scattering. Extremely high counting rates of these characteristic inelastic gamma rays are encountered in this process. In fact, instantaneous counting rates during the neutron burst on the order of 500,000 counts per second are not uncommon. Voltage signals representative of the energy of the gamma rays detected during the neutron bursts are sent to the surface and processed in a multichannel pulse height analyzer system. In this system, the counts due to inelastic scattering by carbon and oxygen are separated from other inelastic gamma rays on an energy basis. A ratio signal representative of the relative counting rates from these two elements is formed.

As the carbon to oxygen ratio in a hydrocarbon is substantially higher than the carbon to oxygen ratio in a water sand, this well log may be used to indicate directly the presence of hydrocarbon in the pore spaces of the earth formation surrounding the cased well borehole.

As previously discussed, one shortcoming of this system has been due to the high instantaneous counting rates encountered in performing the inelastic gamma ray detection during the bursts of high energy neutrons from a neutron accelerator. In the present invention, this shortcoming is largely overcome by measuring capture and activation gamma ray events rather than the inelastic gamma ray events. In the present invention capture gamma rays from the element hydrogen are detected along with the activation capture gamma rays from the element oxygen. As the hydrogen to oxygen ratio is substantially different for hydrocarbons than for water, then a well log which is indicative of hydrocarbon in the pore spaces of earth formations surrounding the well borehole may be obtained. The high instantaneous counting rate encountered during the neutron burst are substantially reduced. The information bearing voltage pulses produced by the downhole portion of the well logging system of the present invention are more easily processed without being subject to the shortcoming of pulse pile up due to high instantaneous counting rates.

Pulse pile up is the interference caused by the occurrence close together in time (overlapping) of gamma ray voltage pulses in the detector portion of the well logging system. This phenomena causes distortion of the pulses when applied to the well logging cable conductor for transmission of these data to the surface. The present invention provides satisfactory discrimination techniques for distinguishing oil from water in earth formations surrounding a well bore while not encountering pulse distortion due to this phenomena.

Additionally, in the present invention in earth formations containing salt water in the pore spaces therein, any chlorine present in such salt water is detected by the use of selective gamma ray time and energy gating means. Thus, in the present invention, both neutron lifetime and chlorine log information is produced simultaneously with the well log information pertaining to the hydrogen and oxygen content of these earth formations.

Accordingly, it is an object of the present invention to provide a new and useful well logging technique for determining the presence of hydrocarbon in earth formations of the vicinity of a well borehole.

Another object of the present invention is to provide a well logging system for determining simultaneously the hydrocarbon content and chlorine content together with thermal neutron lifetime information of earth formations in the vicinity of a cased well bore.

Yet another object of the present invention is to provide a novel well logging system for the direct indication of hydrocarbon which avoids transmission interference problems due to pulse pile up on the well logging cable.

BRIEF DESCRIPTION OF THE INVENTION

The above and other objects, features and advantages are disclosed in the present invention for performing a hydrogen/oxygen ratio well log together with a neutron lifetime and a chlorine well log simultaneously. A well logging tool, or sonde, sized for passage through a cased well bore is provided with a pulsed neutron generator of the deterium-tritium type which repetitively emits approximately one millisecond duration pulses of 14 MEV neutrons. The sonde is also provided with a two inch by four inch cylindrical sodium iodide (thallium activated) detector which is optically coupled to a photomultiplier tube. This detector provides voltage pulse information concerning gamma rays emitted by elements capturing neutrons and comprising the earth formations surrounding the borehole. The voltage pulse information from the detector is supplied along with appropriate synchronization and gain stabilization control pulses to the well logging cable and transmitted to the surface of the earth.

At the surface three time gating means are used to gate out portions of the down hole voltage pulse data corresponding to three different time intervals following the neutron pulse. Two of these time intervals contain information which may be used to determine the neutron lifetime. Similarly, one of the time gating intervals which is used for this purpose is also used as the low bias counting rate in a conventional chlorine log for providing information pertaining to the chlorine content of the earth formations in the vicinity of the borehole. The third time gate provides information which is interpreted by energy selective pulse separating means for discriminating gamma rays caused by the neutron activation of oxygen atoms in the materials in the vicinity of the borehole. Moreover, the energy selective pulse type separating means is used to separate the data pulses caused during the counting intervals into those produced by the elements hydrogen, oxygen and chlorine. Appropriate data processing circuitry is provided to determine the thermal neutron lifetime (or thermal neutron decay time), the chlorine log, and the hydrogen to oxygen ratio log of the earth formations in the vicinity of the borehole simultaneously. These logs are recorded as a function of borehole depth of the well logging sonde.

Other objects, features and advantages of the invention will become apparent from the following detailed description. The present invention is best understood by reference to the following detailed description thereof when taken in conjunction with the accompanying drawings in which:

DESCRIPTION OF THE PREFERRED EMBODIMENT

Figure 1:
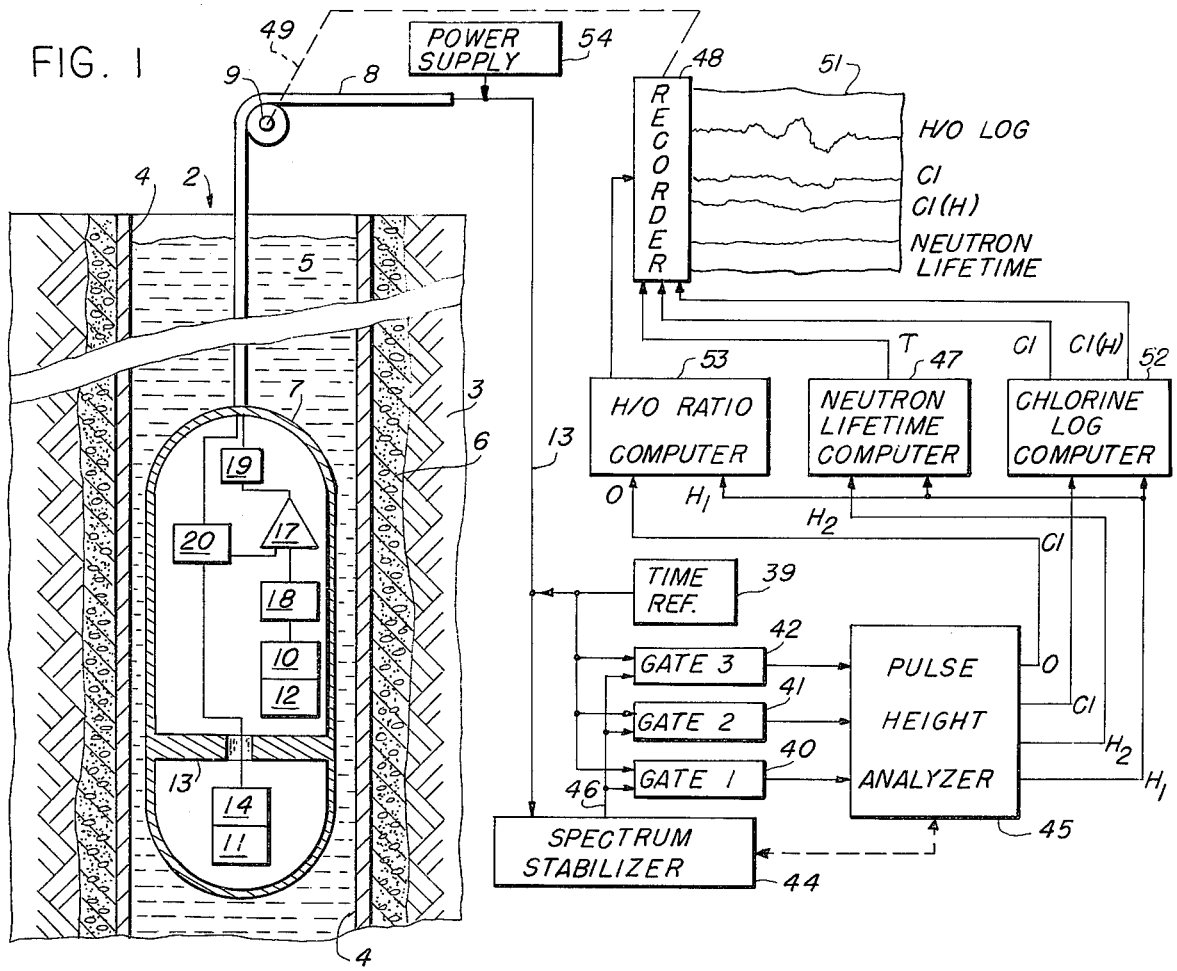
FIG. 1 is an overall block diagram illustrating components of the well logging system of the present invention both downhole and at the surface.

Referring initially to FIG. 1, there may be seen a simplified functional representation in the form of a block diagram of well logging system in accordance with the present invention. A borehole 2 penetrating earth formations 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated fluid-tight hollow body member or sonde 7 which, during the logging operation, is passed longitudinally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional multi-conductor armored well logging type and having several electrical conductors for transmitting such signals between the sonde 7 and the surface apparatus. On the other hand, the well logging cable 8 could be comprised, if desired, of armored coaxial or triaxial type well logging cable with a better high frequency response characteristic than the multi-conductor well logging cable previously mentioned.

Again referring to FIG. 1, the sonde 7 contains a source of high energy neutrons 11. The neutron source contemplated for use herein is a pulse neutron source operating from the principle of the deuterium-tritium reaction. In such a source deuterium ions are accelerated by a high potential voltage onto a target impregnated with tritium. The resulting nuclear interaction causes the emission of 14 MEV neutrons. However, it should be understood by those skilled in the art that the present invention is not limited to this particular type of neutron source but could use other types of neutron sources such as mechanical pulsed neutron sources, so long as sufficiently energetic neutrons are provided.

A suitable radiation detector comprising a photomultiplier tube 10 and a detector crystal 12 is provided in the downhole sonde 7 for detecting gamma rays resulting from the interaction of the high energy neutrons with the materials comprising the earth formations and contained in the pore spaces of the earth formations surrounding the well borehole 2. A radiation shield 13 comprised of lead, iron, paraffin or other suitable material is interposed between the neutron accelerator tube 11 and the detector crystal 12 of the apparatus. This reduces the probability of thermal neutrons reaching the detector crystal 12 and causing neutron activation of the iodine or sodium atoms comprising the crystal. The detector crystal 12 may comprise for example a thallium doped sodium iodide, cesium iodide or other similar activated material which is optically coupled to the photomultiplier tube 10.

As well known in the art, the scintillation crystal 12 produces a discrete flash of light whenever a gamma ray passes therethrough and exchanges energy with its crystal lattice structure. The photomultiplier tube 10 optically coupled thereto generates a voltage pulse proportional in height to the intensity of each such scintillation which occurs in the crystal 12. The intensity of such scintillation is functionally related to the energy of the gamma ray causing the light flash or scintillation and thus a voltage pulse generated by the photomultiplier tube 10 has an amplitude which is functionally related to the energy of the gamma ray causing the light flash or scintillation in the crystal 12. These proportional voltage pulses produced by the photomultiplier tube 10 comprise a detector signal which is supplied to a linear amplifier 17 via a discriminator 18. The discriminator 18 may be used as desired to discriminate or eliminate, for example, low energy background gamma radiation resulting from thermal neutron activation of the detector crystal itself. A preset bias level may be used to pass only pulses from the photomultiplier tube 10 which exceed a height corresponding to 0.5 MEV gamma rays generated by nuclear reactions in materials surrounding the well borehole. Thus lower energy background gamma rays which could contribute to pulse pile up or pulse distortion on the well logging cable can be eliminated.

The neutron accelerator tube 11 is preferably operated by a pulsing circuit 14 which may be of conventional design as known in the art. Pulsing circuit 14 functions to operate the neutron accelerator 11 in relatively short duration pulses. Pulsing circuit 14 may be controlled for example by control pulses from a pulser 20 which is signalled by a surface timing reference 39. For example, the pulser 20 could be activated by a timing pulse from the time reference 39 to generate a control pulse causing pulsing circuit 14 to turn on generator tube 11 to emit a neutron burst of a specified time duration. In the present invention the preferred time duration for the neutron bursts is approximately one millisecond.

The frequency of such bursts would then be controlled by the surface timing reference 39. Of course it will be apparent to those skilled in the art that the timing reference 39 could be relocated in the downhole sonde if desired.

In the present invention it is contemplated to operate the neutron accelerator in the pulsed mode at a repetition frequency of approximately 100 pulses per second. Each neutron pulse is approximately one millisecond in duration and the succeeding nine milliseconds between each neutron burst comprises the interval during which the capture and activation gamma ray measurements are made using the techniques of the present invention.

Figure 2:
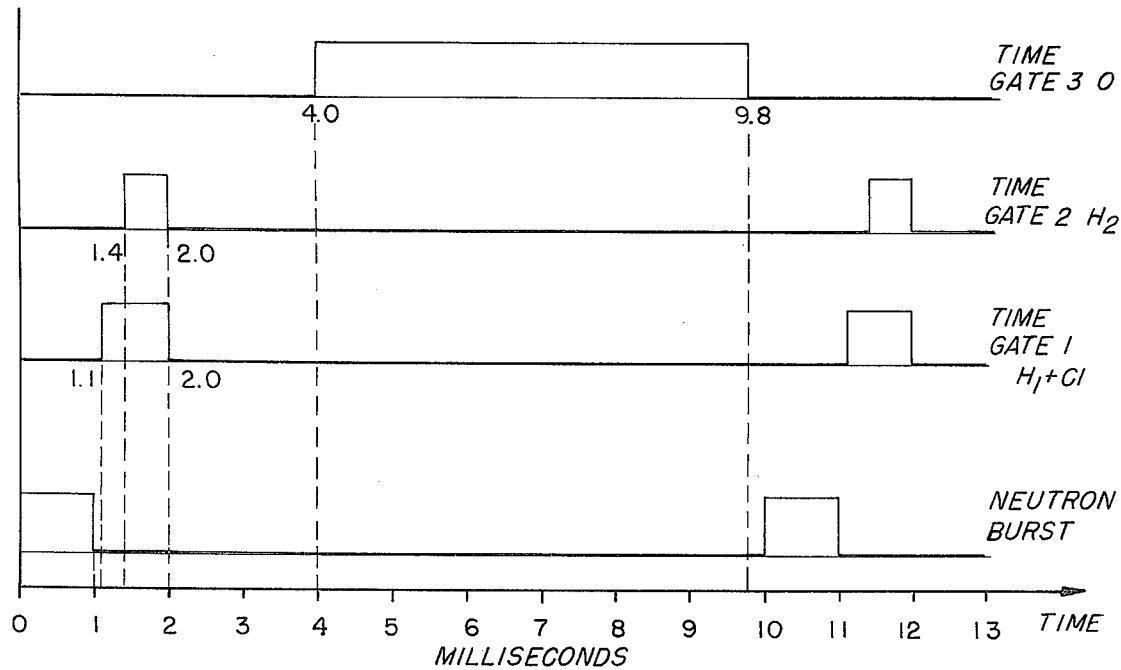
FIG. 2 is a timing diagram illustrating the time gates employed with respect to the preferred embodiment of the present invention.

Still referring to FIG. 1 and now simultaneously referring to the timing diagram of FIG. 2, the operation of the time gates 40, 41 and 42 of the present invention will be described in more detail. Time gate 1 (40 of FIG. 1) is opened immediately following the cessation of a neutron burst as illustrated in FIG. 2 and is opened from a time 1.1 milliseconds following the beginning of the burst until 2.0 milliseconds following the beginning of the burst. Data signals from the downhole tool are supplied to gate 1 (40) via a spectrum stabilizer 44 which utilizes signals from the downhole pulser 20 for controlling the gain of the system in a linear manner. For this purpose, for example, techniques such as those described in U.S. Pat. No. 3,767,921, which is assigned to the assignee of the present invention, may be used. The spectrum stabilizer 44 thus functions to detect any drift in the amplification of the energy discrimination or pulse height analyzer circuit 45 of FIG. 1 and to control the amplification of the system to maintain linearaity in preserving the pulse height information supplied via the well logging cable 8 and conductor 13 thereof as depicted in FIG. 1.

Gain stabilized signals are supplied from the spectrum stabilizer 44 via line 46 to time gates 40, 41 and 42 as previously discussed. Time gate 2 (41 of FIG. 1) is conditioned by timing pulses from the time reference 39 to permit data pulses on line 46 to be passed to the subsequent circuitry from a time 1.4 millisecond following the beginning of the neutron burst until 2.0 milliseconds following the neutron burst as depicted in FIG. 2. Similarly time gate 3 (42 of FIG. 1) is conditioned by timing pulses from the time reference 39 to permit the passage of data pulses during the interval from 4 milliseconds following the beginning of the nuetron burst, to 9.8 milliseconds following the beginning of the neutron burst as depicted in FIG. 2.

Figure 4:
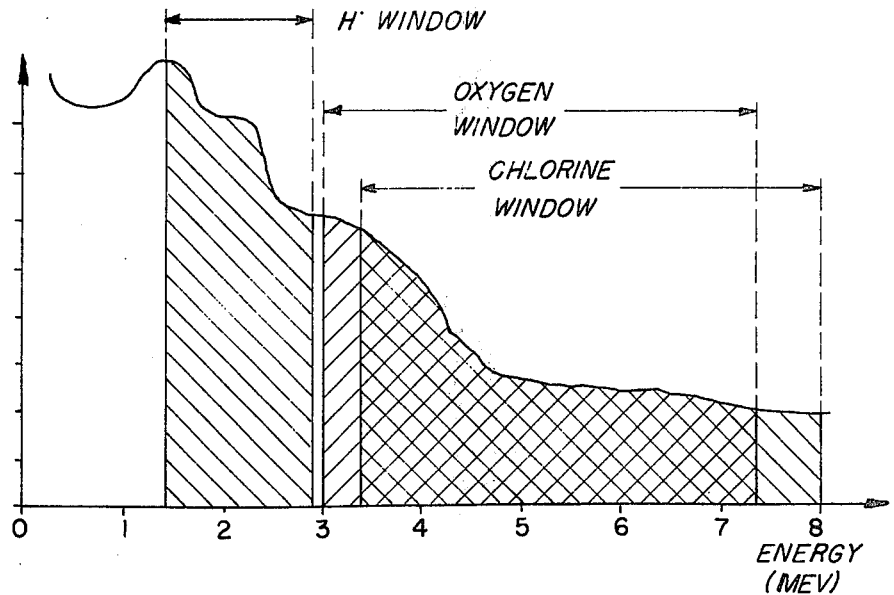
FIG. 4 illustrates the energy windows or regions used to discriminate and separate characteristic gamma rays from various elements according to the method of the present invention.

The data pulses from the time gates 40, 41 and 42 are supplied as input to a pulse height analyzer 45. The pulse height analyzer 45 functions to sort and accumulate a total of gamma ray pulses occurring in a plurality of energy regions or windows in the gamma ray spectrum supplied from the downhole logging sonde 7. As will be explained in more detail subsequently, a hydrogen energy region depicted in FIG. 4 which extends from 1.3 to 2.9 MEV is used to count the number of voltage pulses representative of the captured gamma rays from the element hydrogen in the earth formation surrounding the well borehole. Pulses occurring in time gates 40 and 41 are allowed to enter the pulse height analyzer 45 during these two time gating intervals and are discriminated from other pulses occurring during these two time gating intervals by the pulse height analyzer 45. The counts occurring in this hydrogen energy window during the two time gates 40 and 41 are represented at output lines labeled H1 and H2 in FIG. 1. Also, during the period of operation of time gate 1 (40 of FIG. 1) a chlorine energy window extending from 3.4 to 8.0 MEV in the gamma ray energy spectrum of FIG. 4 is allowed to receive data pulses from the gate 40. These pulses are used as will be subsequently described in more detail in obtaining the chlorine log.

Similarly, an oxygen energy window extending from 3.0 to 7.25 MEV as depicted in FIG. 4 receives data pulses occurring in this energy range during the period of time in which the time gate 42 is open. Other energy pulses are discriminated against during this time interval. The pulse height analyzer 45 applies the count of the chlorine and oxygen pulses accumulated during these respective time intervals on output lines labeled Cl and O in FIG. 1.

Figure 3:
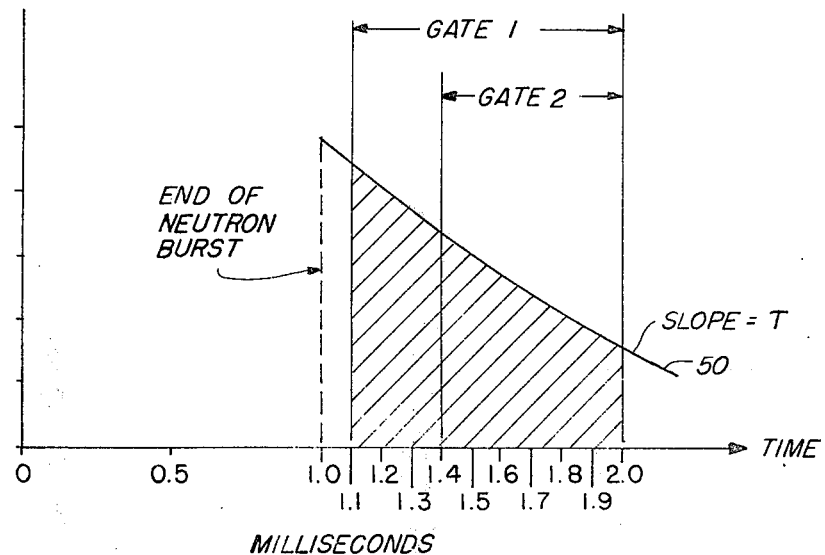
FIG. 3 illustrates the time gates employed in the present invention in determining the neutron lifetime (or thermal neutron decay time) of thermal neutrons in the vicinity of the well bore.

Now concerning the operation of the neutron lifetime computer 47 in determining the thermal neutron lifetime (or thermal neutron decay time) we will refer to FIG. 3. Following each burst of high energy neutrons from the accelerator 11 in the downhole tool 7, the neutrons are rapidly slowed down in the hole and formation to thermal energy by collisions with the nuclei of atoms comprising the media in the vicinity of the well bore. The thermalized neutrons are then captured by nuclei with the corresponding emission of characteristic capture gamma rays. If neutron capture is the only process occurring during the time interval after the burst of high energy neutrons has reached thermal equilibrium, then the neutron density N decays according to the equation $$N = N_0 e^{-t/\tau \, intrinsic}$$

where $t$ is a time measured from an initial time $t_o$ following the neutron burst at which the neutrons have reached thermal equilibrium and $N_o$ is the initial neutron density at $t_o$. $\tau$ intrinsic is the thermal neutron intrinsic decay time.

The graph of FIG. 3 represents the exponential decay (i.e. curve 50 of FIG. 3) during this time interval. It will be recalled that time gates 40 and 41 of FIG. 1 generate the two count signals H1 and H2 via pulse height analyzer 45 occurring in the hydrogen energy window of FIG. 4 during the time that the two time gates 40 and 41 are opened to receive data pulses from the down hole sonde 7. These time gates are depicted in the enlarged detail and superimposed over the decay curve 50 of FIG. 3. The slope of the exponential decay curve 50 is equal to the intrinsic neutron decay time intrinsic of the formation in the vicinity of the borehole provided neutron capture is the only process taking place during this time interval. Thus by considering the counts occurring in the time gate 1 (gate 40 of FIG. 1) and time gate 2 (gate 41 of FIG. 1) hydrogen energy window as being representative of the entire thermal neutron population in the vicinity of the well bore during these two gating intervals, the slope of the curve 50 may be measured by considering these counts as being two points on the exponential and obtaining the slope thereof in the usual manner. This slope computation is performed in the neutron lifetime computer 47 when supplied with the $H_1$ and $H_2$ inputs provided by the pulse height analyzer 45 of FIG. 1. The neutron lifetime computer 47 thus computes the slope of this exponential decay curve and provides an output labeled $\tau$ in FIG. 1 to a well logging recorder of conventional type 48 of FIG. 1.

The recorder 48 is electrically or mechanically linked to the sheave wheel 9 as indicated by the dotted line 49 of FIG. 1 and hence moves a record medium 51 as a function of borehole depth to record the quantities (neutron lifetime) and the other quantities to be described.

It may be shown that the macroscopic capture cross section $\Sigma$ of earth formations in the vicinity of a bore hole is given by the equation:

$$\Sigma = \frac{4550}{\tau \, (microseconds)}$$

where $\Sigma$ is given in capture units where one capture unit equals $10^{-3}$ CM2/CM3

Figure 5:
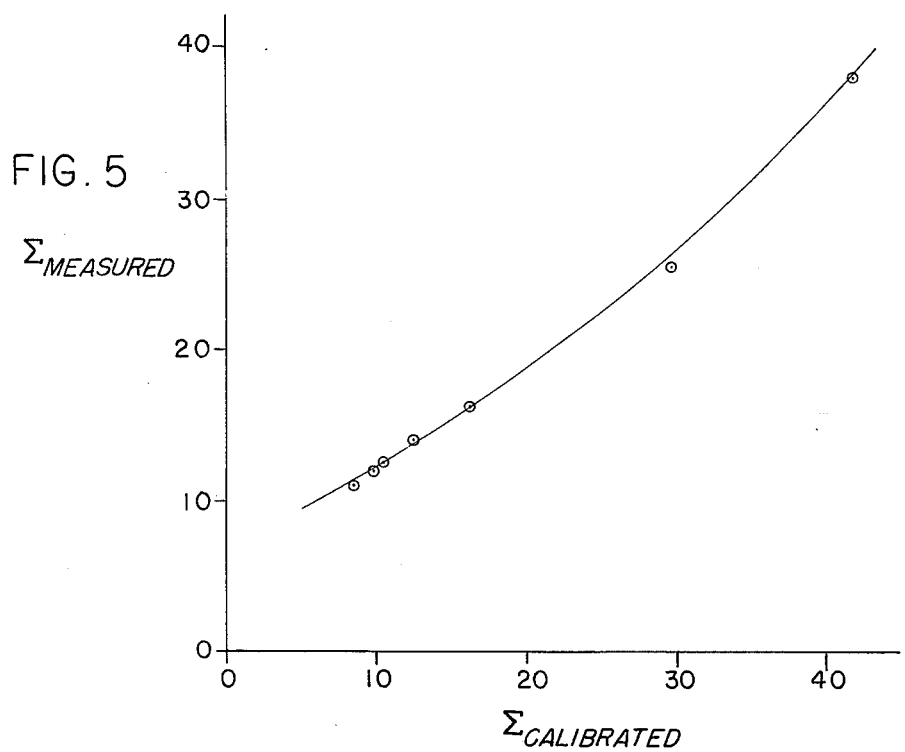
FIGS. 5 and 6 are graphical representations which illustrate calibrations relating the macroscopic neutron cross section and neutron lifetime as measured by the present invention to known macroscopic neutron cross sections and neutron lifetimes.
Figure 6:
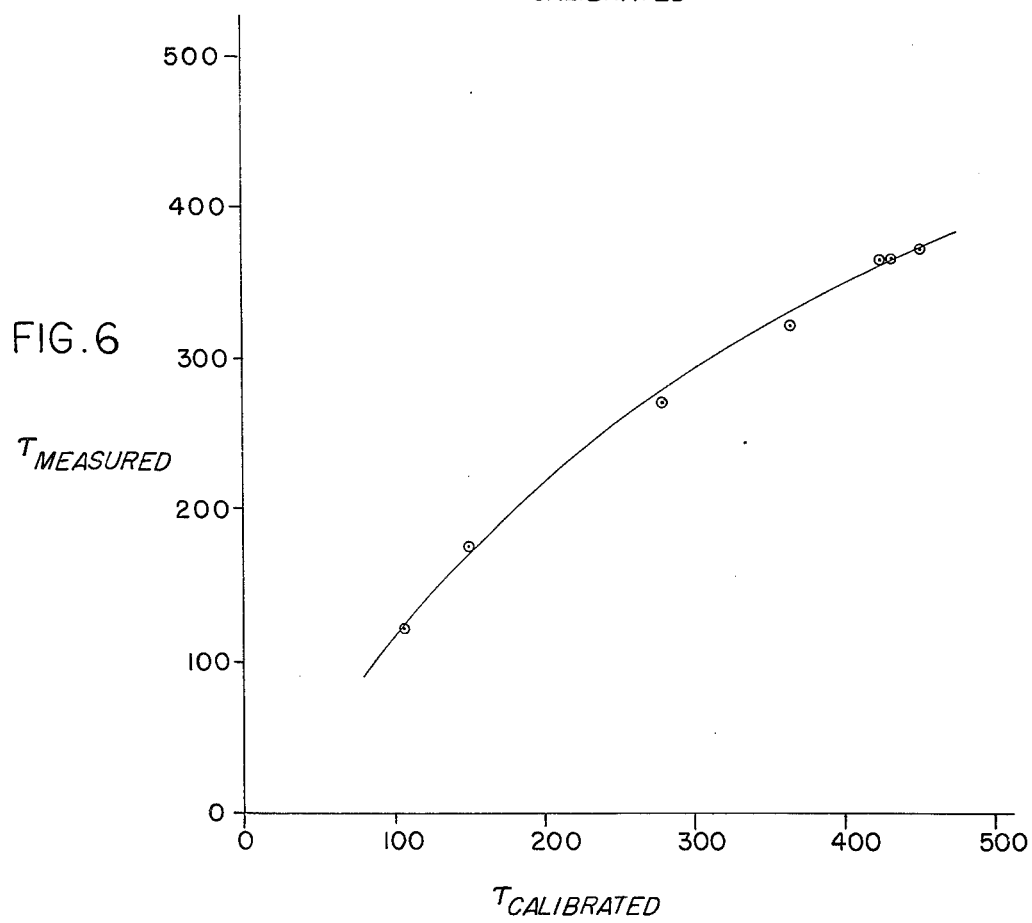

As the macroscopic neutron captures cross section $\Sigma$ is a good indicator of the types of liquids present in the pore space of the rock matrix surrounding the well borehole and is particularly sensitive to the element chlorine which has a large capture cross section, this information can be very useful in determining the water saturation and oil saturation of the rock matrix in the vicinity of the well bore. However, the $\Sigma$ or $\tau$ determined from the well logging measurement during the time that time gates 40 and 41 are opened in this manner assumes that neutron capture is the only process taking place. Neutron diffusion and other borehole effects can cause this measurement to contain a slight error. Accordingly, FIG. 5 and FIG. 6 are presented to illustrate the relationship between $\tau$ as measured in the manner described with respect to FIGS. 1 and 3 and the measured value of $\tau$ (labelled $\tau$ cal) in a rock matrix having a known fluid content and thermal neutron decay time. The graph of FIG. 6 illustrates the relationship between the $\tau$ measured on the ordinate and the $\tau$ calibrated on the abcissa. This graph indicates a slight correction factor which must be applied in interpreting these neutron lifetime or thermal decay times. Similarly, if the log produced by recorder 48 of FIG. 1 is presented in terms of capture cross section $\Sigma$ rather than in decay time $\tau$ the graph of FIG. 5 illustrates the correction factor between the $\Sigma$ measured by the method described with respect to FIGS. 1, 2 and 3 and the $\Sigma$ calibrated of the known earth media.

Thus by means of FIGS. 5 and 6 the measured macroscopic cross sections $\Sigma$ or neutron lifetime $\tau$ may be corrected for other effects such as neutron diffusion and borehole effect after these curves are plotted on the record media 51 of FIG. 1. Alternatively this correction process can be performed by the neutron lifetime computer 47 and a corrected curve plotted directly by the recorder 48 on the record medium 51 of FIG. 1. If desired all computations performed by computers 47, 52 and 53 of FIG. 1 can be done in a small general purpose digital computer, properly programmed. A computer found useful for this purpose could be, for example, a Model PDP-11 computer made by the Digital Equipment Co. of Cambridge, Mass.

The basic chlorine logging technique is disclosed is U.S. Pat. No. 3,219,820 which is assigned to the assignee of the present invention. Basically this log comprises observing the capture gamma ray counts in two different portions of the gamma ray energy spectrum corresponding to the hydrogen window and the chlorine window of FIG. 4 as previously described. When these curves are overlayed any decrease in the counting rate of the chlorine curve relative to the hydrogen curve that is larger than expected due to borehole size variation or shale anomalies (due to boron in the shale) indicates a low chlorine content of the fluid in the pore spaces surrounding the borehole. This is an indicator of either fresh water or hydrocarbon. When combined with the hydrogen to oxygen ratio curve, which will be derived in the manner to be described subsequently, the fresh water anomalies may be removed and an interpretation of the two curve chlorine log can yield indications of the hydrocarbon content of the earth formations in the vicinity of the borehole. Quantitative techniques for interpreting the chlorine log can be derived wherein the hydrogen counting rate is plotted against the chlorine counting rate in regions of interest (i.e. those showing an unexpectedly low chlorine count rate) and a family of lines corresponding to different percentage water saturations for different matrix materials can be established. Thus this log can also provide quantitative water saturation information.

The chlorine log computer 52 of FIG. 1 performs preprocessing of the data to correct for borehole effects in the manner described in the aforementioned U.S. Patent. Curves representative of the hydrogen and chlorine energy window (of FIG. 4) counting rates during the interval which time gate 40 (FIG. 1) is open are plotted on the record medium 51 by the well logging recorder 48 as a function of borehole depth. The data are derived by the chlorine computer 52 from the $H_1$ and $C_1$ energy window data supplied by the pulse height analyzer 45.

Data pulses from the downhole sonde 7 occurring during the time interval in which time gate 3 (42 of FIG. 1) is open are indicative of the gamma rays produced by the activation of the elemental oxygen in the media surrounding the borehole. A signal representative of this counting rate is provided from the pulse height analyzer 41 of FIG. 1 and labeled O. This oxygen information in addition to the H1 (i.e. the counting rate in the hydrogen window during time gate 1) information is supplied as input to a hydrogen to oxygen ratio computer 53 of FIG. 1. The hydrogen to oxygen ratio computer 53 forms the ratio of these two counting rates. This data is input to the recorder 48 which plots a representative well log on record medium 51 of the quantity H/O as a function of borehole depth of the sonde 7.

Figure 7:
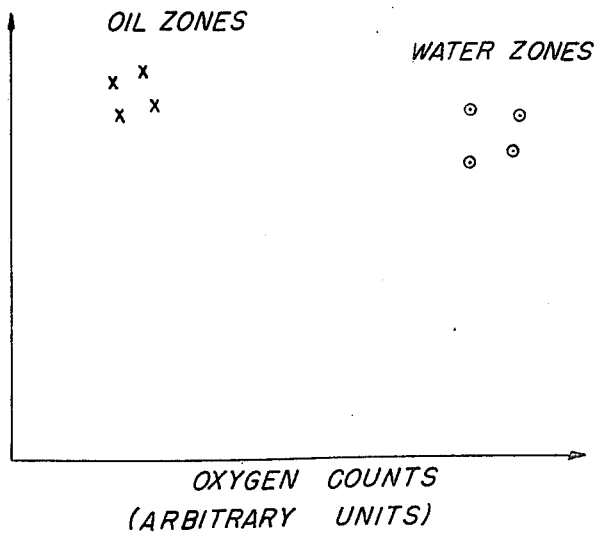
FIG. 7 is a graphical representation illustrating how oil zones and water zones responses may be distinguished from the hydrogen and oxygen counting rates measured by the well logging system of the present invention.

Referring now to FIG. 7 a cross plot of the counts occurring in the hydrogen window (FIG. 4) during time gate 1 ($H_1$) and the oxygen counts occurring in the oxygen energy window of FIG. 4 during time gate 3 is shown. If the data points in known oil zones and in known water zones are observed it will be seen from FIG. 7 that there is a wide separation in the counting rates in the hydrogen window and in the oxygen window between these two zones. This counting rate difference is independent of the presence of elemental chlorine in the waters contained in the pore spaces of the rock matrix. Since hydrocarbon contains much less oxygen than water in the pore spaces of the media surrounding the well bore, it is apparent that in an oil zone a hydrogen to oxygen ratio computer 53 of FIG. 1 will assume a much larger value in the oil zone than it will in a zone containing either fresh or salt water. Thus the hydrogen to oxygen ratio log plotted on the record medium 51 is a direct indicator of hydrocarbon in the pore spaces of the earth formations in the vicinity of the borehole.

Summarizing the operation of the well logging system of the present invention, a pulsed source of high energy neutrons in a downhole sonde is repetitively operated to produce approximately one millisecond bursts of high energy neutrons. Some fast neutrons interact and other are slowed down and interact with the nuclei of atoms in the materials forming the rock matrix in the vicinity of the well bore. Gamma rays are produced when the neutrons interact with these materials, and are characteristic of certain elements producing the gamma rays. A detector in the downhole sonde senses the gamma rays so produced and generates voltage pulses representative thereof. These representative voltage pulses are transmitted to the surface over conductors of the well logging cable 8 and are presented as input to a spectrum stabilizer gain control system. The gain adjusted or linearized pulses are supplied via three time gates to a pulse height analyzer. The pulse height analyzer breaks them down according to energy characteristics. Output signals from the pulse height analyzer are supplied to a chlorine log computer, a neutron lifetime log computer and a hydrogen to oxygen ratio computer. Output signals from the three computers (or from a single general purpose digital computer corresponding to these three functions) are supplied to a well logging recorded and plotted on a record medium 51 as a function of borehole depth.

While not specifically depicted in FIG. 1, it will be understood by those skilled in the art that the downhole sonde 7 is supplied with appropriate power supplies (now shown) for supplying the downhole portion of the circuitry with electrical power for its operation. This power may be furnished from a surface power supply 54 via conductors on the well logging cable 8 and converted to operational voltages appropriate for use in the downhole sonde by the power supplies contained therein in a conventional manner.

The foregoing disclosure may make other alternative embodiments of the invention apparent to those skilled in the art. It is, therefore, the aim in the appended claims to cover all such changes and modifications which fall within the true spirit and scope of the invention.

I claim:

1. A method for logging a well borehole to obtain direct indications of the hydrocarbon bearing earth strata penetrated thereby, comprising the steps of:
    passing a well tool having a pulsed source of fast neutrons and a radiation detector longitudinally spaced therefrom through a well borehole;
    repetitively irradiating the earth formations in the vicinity of the borehole with bursts of fast neutrons;
    detecting, subsequent to said neutron bursts, gamma radiations attributable to the capture of neutrons by elemental hydrogen and oxygen in the vicinity of the borehole and generating signals representative thereof;
    forming a ratio signal representative of the ratio of said signals representative of elemental hydrogen and oxygen in the vicinity of the well borehole; and
    recording said representative ratio signal as a function of the borehole depth of said well tool.

2. The method of claim 1 wherein the step of repetitively irradiating the earth formations in the borehole vicinity is performed by irradiating the formation with approximately one miillisecond duration bursts of approximately 14 MEV neutrons.

3. The method of claim 1 wherein the step of detecting, subsequent to said neutron bursts, is performed by detecting in a first time interval subsequent to said neutron bursts, gamma rays attributable to the capture of neutrons by hydrogen and detecting in a second, subsequent to said first, time interval gamma gamma rays attributable to the radioactive decay of unstable isotopes created by the capture of neutrons by oxygen and generating signals representative thereof.

4. The method of claim 3 wherein said first time interval commences subsequent to the cessation of said neutron bursts by approximately 0.1 milliseconds and said second time interval commences subsequent to said neutron bursts by approximately 3.0 milliseconds.

5. The method of claim 4 wherein said first time interval is approximately 0.9 milliseconds duration and said second time interval is approximately 5.8 milliseconds duration.

6. A method for logging a well borehole to obtain direct indications, of the hydrocarbon bearing earth strata penetrated thereby, comprising the steps of:

passing a well tool having a pulsed source of fast neutrons and a radiation detector longitudinally spaced therefrom through a well borehole;

repetitively irradiating the earth formations in the vicinity of the borehole with bursts of fast neutrons;

detecting in a first time interval subsequent to said neutron bursts gamma radiation attributable to the capture of neutrons by elemental hydrogen and generating an $H_1$ signal representative thereof;

detecting in a second time interval subsequent to said neutron bursts gamma radiation attributable to the capture of neutrons by elemental hydrogen and generating an $H_2$ signal representative thereof;

combining said $H_1$ signal and said $H_2$ signal according to a predetermined relationship to derive a representative signal functionally related to the thermal neutron lifetime of materials in the vicinity of the borehole; and recording said neutron lifetime signal as a function of the borehole depth of said well tool.

7. The method of claim 6 wherein said first and second time intervals are of unequal duration and overlap each other in time.

8. The method of claim 6 and further including the step of detecting in a third time interval subsequent to said neutron bursts gamma radiations attributable to the capture of neutrons by elemental oxygen in the vicinity of the borehole and generating signals representative thereof;

forming a ratio signal representative of the ratio of said signals representative of elemental hydrogen and oxygen in the vicinity of the borehole; and recording said ratio signal as a function of the borehole depth of said well tool.

9. The method of claim 8 wherein the step of forming said ratio signal is performed by forming the ratio of said $H_1$ signal and said representative signals attributable to the capture of neutrons by elemental oxygen.

10. The method of claim 8 wherein said first time interval commences subsequent to the cessation of said neutron bursts by approximately 0.1 milliseconds, said second time interval commences subsequent to the cessation of said neutron bursts by approximately 0.4 milliseconds and said third time interval commences subsequent to said neutron bursts by approximately 3.0 milliseconds.

11. The method of claim 10 wherein said first time interval is of approximately 0.9 milliseconds duration, said second time interval is of approximately 0.6 milliseconds duration and said third time interval is of approximately 5.8 milliseconds duration.

12. A method for logging a well borehold to obtain direct indications of the hydrocarbon bearing earth strata penetrated thereby, comprising the steps of:

passing a well tool having a pulsed source of fast neutrons and a radiation detector longitudinally spaced therefrom through a well borehole;

repetitively irradiating the earth formations in the vicinity of the borehole with bursts of fast neutrons;

detecting, in a first time interval subsequent to said neutron bursts, gamma radiations attributable to the capture of neutrons by elemental hydrogen in the vicinity of the borehole and generating an $H_1$ signal representative thereof;

detecting in said first time interval gamma radiations attributable to the capture of neutrons by elemental chlorine in the vicinity of the borehole and generating a C1 signal representative thereof;

generating a $C1_{(H)}$ signal functionally related to said $H_1$ signal; and recording said $C1_{(H)}$ signal and said C1 signal as a function of the borehole depth of said well tool.

13. The method of claim 12 wherein the step of generating said $H_1$ signal is performed by detecting gamma radiation falling in the energy range from 1.3 to 2.9 MEV and generating a count signal representative thereof.

14. The method of claim 12 wherein the step of generating said C1 signal is performed by detecting gamma radiations falling in the energy range from 3.4 to 8.0 MEV and generating a count signal representative thereof.

15. The method of claim 12 and further including the steps of:

detecting in a second time interval subsequent to said neutron bursts gamma radiation attributable to the capture of neutrons by elemental hydrogen in the vicinity of the borehole and generating an $H_2$ signal representative thereof;

combining said $H_1$ and $H_2$ signals according to a predetermined relationship to generate a signal functionally related to the thermal neutron lifetime of materials in the vicinity of the borehole; and recording said neutron lifetime signal as a function of the borehole depth of said well tool.

16. The method of claim 15 wherein the steps of generating said $H_1$ and $H_2$ signals are performed by detecting gamma radiations in the energy range from 1.3 to 2.9 MEV in said first and second time intervals and generating count signals representative thereof.

17. The method of claim 15 wherein said second time interval commences approximately 0.4 milliseconds following cessation of said neutron bursts and is of approximately 0.6 milliseconds duration.

18. The method of claim 15 and further including the steps of:

detecting in a third time interval subsequent to said neutron bursts gamma radiations attributable to the capture of neutrons by elemental oxygen in the vicinity of the borehole and generating an O signal representative thereof;

generating a ratio signal representative of the ratio of said $H_1$ signal and said O signal; and recording said ratio signal as a function of the borehole depth of said well tool.

19. The method of claim 18 wherein the step of generating said O signal is performed by detecting gamma radiations in the energy range 3.0 to 7.25 MEV in said third time interval and generating count signals representative thereof.

20. The method of claim 18 wherein said third time interval commences approximately 3.0 milliseconds following cessation of said neutron bursts and is of approximately 5.8 milliseconds duration.

* * * * *